Aug. 3, 1954   N. E. WAHLBERG ET AL   2,685,244
AIR CONDITIONING SYSTEM
Filed Feb. 25, 1950   3 Sheets-Sheet 1

NILS ERIK WAHLBERG,
JOSEPH F. SLADKY, INVENTORS

BY Carl J. Barbee
HIS ATTORNEY

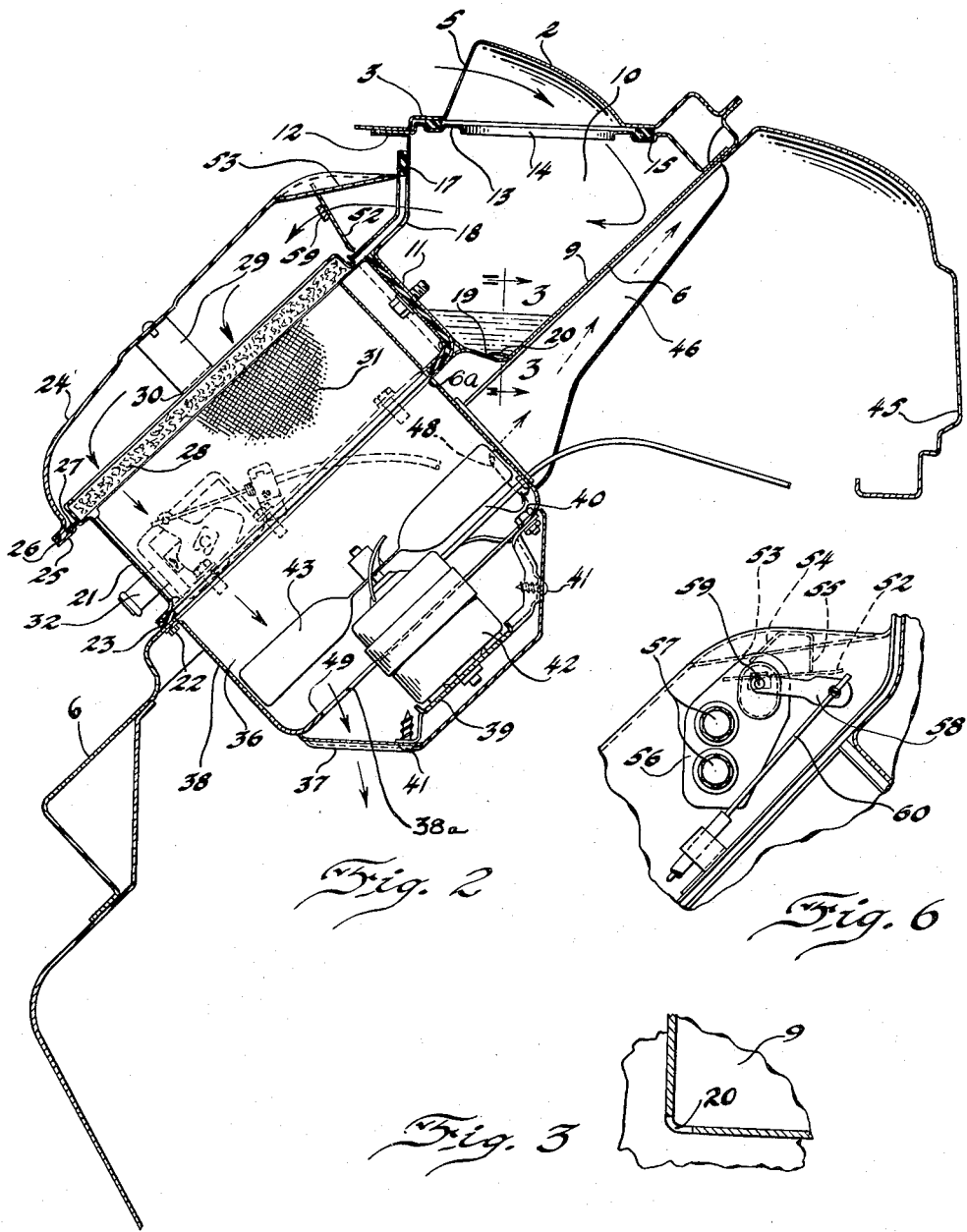

Aug. 3, 1954 N. E. WAHLBERG ET AL 2,685,244
AIR CONDITIONING SYSTEM
Filed Feb. 25, 1950 3 Sheets-Sheet 3
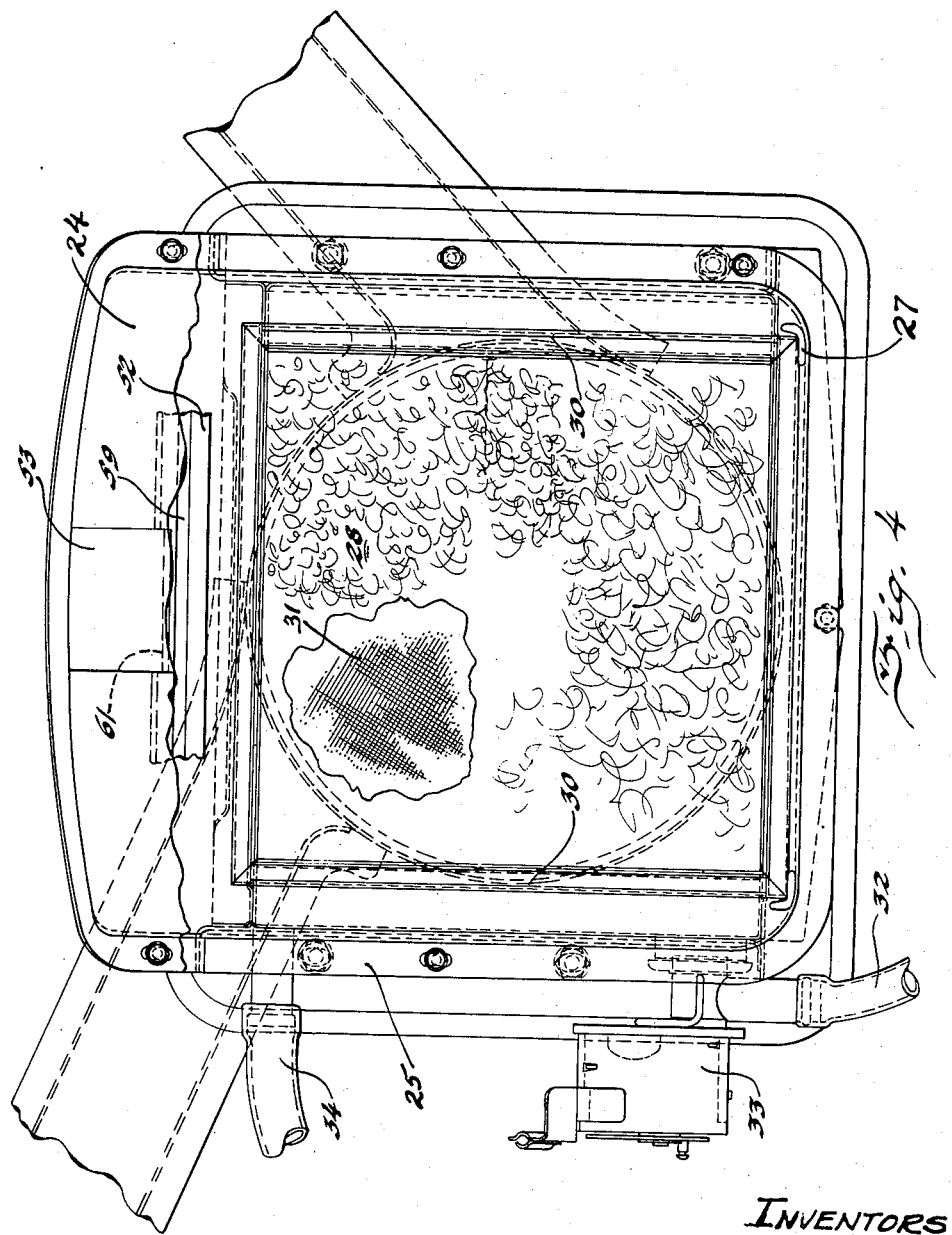
INVENTORS
NILS ERIK WAHLBERG
JOSEPH F. SLADKY.
BY Carl J Barbee
HIS ATTORNEYS.

Patented Aug. 3, 1954

2,685,244

UNITED STATES PATENT OFFICE 2,685,244

AIR CONDITIONING SYSTEM

Nils Erik Wahlberg, Chicago, Ill., and Joseph F. Sladky, Plymouth, Mich., assignors to Nash-Kelvinator Corporation, Kenosha, Wis., a corporation of Maryland Application February 25, 1950, Serial No. 146,248

3 Claims. (Cl. 98—2)

This invention relates to an air conditioning system particularly suitable for installation in a moving vehicle and the invention is shown as it may be applied to an automotive vehicle.

One object of the invention is to provide an air conditioning system which is inexpensive and easy to assemble.

A second object is to provide an air conditioning system in which rain water and other elements in the atmosphere which enter the system are expelled at an early stage, whereas, air entering the system continues traveling therethrough.

A further object consists in the novel arrangement of the parts which make up the system.

A further object is to provide novel means for directing streams of air onto the windshield of the vehicle.

Other objects and advantages of the invention will become apparent upon examination of the specification and the accompanying drawdrawings, in which:

Figure 2 is an enlarged sectional view of the system as shown in Figure 1;

Figure 3 is a fragmentary detail view taken on line 3—3 of Figure 2;

Figure 4 is a fragmentary detail view taken from the interior of the vehicle on line 4—4 of Figure 1;

Figure 6 is a partial view showing a damper mechanism.

Figure 1:
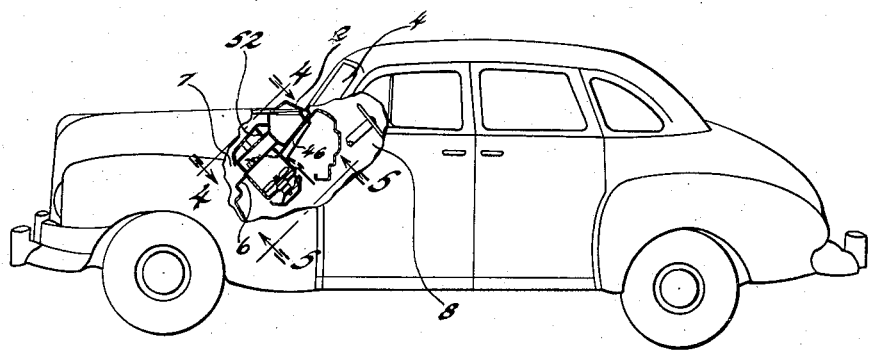
Figure 1 is a side elevational view of an automotive vehicle showing the air conditioning system in section.
Figure 5:
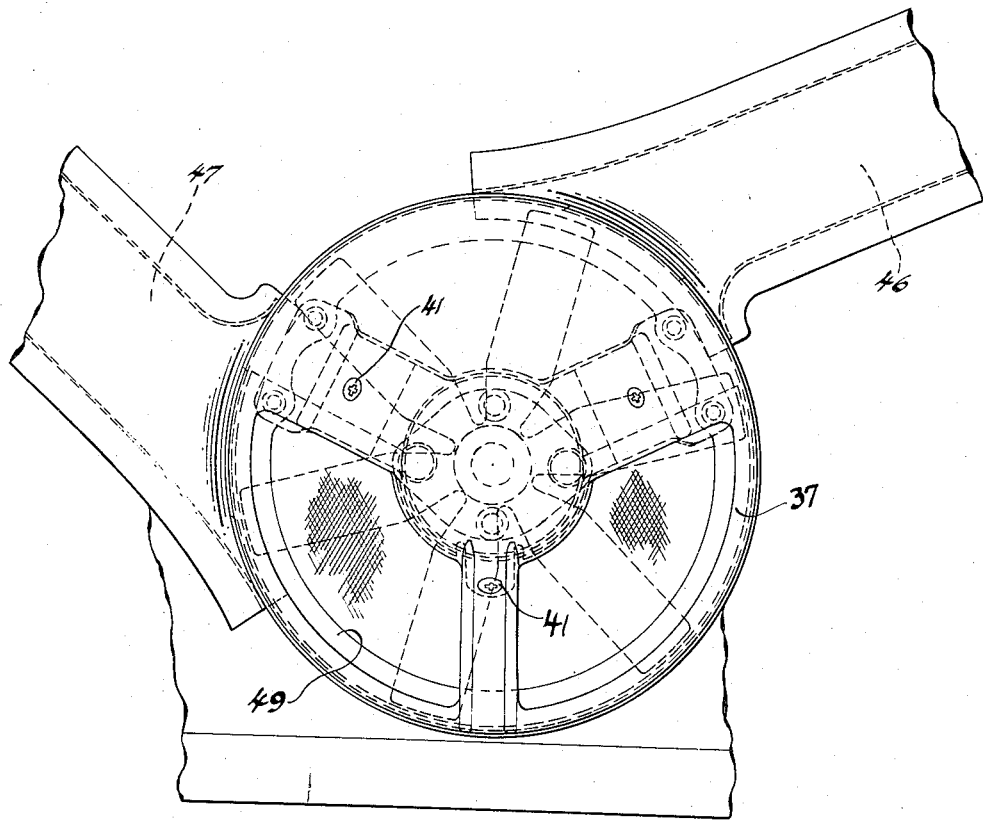
Figure 5 is a plan view taken on the line 5—5 of Figure 1.

Viewing Figure 1, the invention consists generally of a cowl 2 which may be formed in the cross ledge 3 of the vehicle body immediately in front of windshield 4. The cowl 2 has an opening 5 at its forward end through which incoming air enters the system—the greater the speed of the vehicle the greater the C. F. M. of the air entering the system.

A primary panel member 6 extends across the width of the vehicle separating the engine compartment 7 from the interior 8 of the vehicle. The wall 9 on the engine compartment side of the panel member 6 and at the upper end thereof serves as the rear wall of an enclosure, generally referred to as 10, into which enclosure the incoming air which enters through cowl opening 5 is initially received. The enclosure 10 has a forward wall 11, which extends angularly upwardly for some distance and then continues sharply upwardly ultimately terminating with a lip 12 which extends crosswise of the vehicle. A sheet metal stamping 13 having an opening 14 therein is interposed between the lip 12 and ledge 3 and is provided with a sealing ring 15 for preventing the escape of air from the system.

The upper portion 17 of the forward wall 11 is provided with an opening 18 through which the air passes so as to continue through the remainder of the system. It will be noted that the air entering opening 5 first strikes the wall 9 from whence it is deflected toward and through opening 18. On a rainy day water entering opening 5 along with the air strikes wall 9 and accumulates to some extent in the floor region 19 of enclosure 10 and is immediately discharged through the openings 20 in the floor 19. The rain water which is discharged through openings 20 thus travels down the panel member 6 on the engine compartment side and does not accompany the air through opening 18, since the discharge openings 20 are large enough to prevent any accumulation of water sufficient to cause the water level within enclosure 10 to reach the lowermost edge of opening 18.

A boxlike retainer 21 may be secured to panel member 6 by means of bolts 22 with a sealing ring 23 interposed therebetween. A cover 24 may be secured to the outwardly extending flange 25 of retainer 21 and to the upper portion 17 of wall 11 with a sealing ring 26 interposed therebetween. The flange 25 has an inwardly turned bead 27 formed therein which bead locates the bottom edge of the removable filter unit 28. The filter unit is removably held in place with respect to retainer 21 by means of a leaf spring 29 which is secured to cover 24 and the free ends of which contact the peripheral edges of the filter unit at 30. The retainer 21 houses a radiator core 31. Water from the circulating system of the vehicle (not shown) enters the radiator core through conduit 32 after passing through control valve 33 and the water is discharged from the radiator core via conduit 34.

The air entering opening 5 subsequently passes through opening 18, thence through filter unit 28, thence through the radiator core 31 into the fan compartment 36, thence through the opening 6a in the partition panel 6 and thence through cover member 37 into the interior 8 of the vehicle.

The compartment 36 consists of a casing 38 which may be secured to panel member 6 by means of bolts 22. A bracket 39 is secured to the casing 38 by means of bolts 40 and cover 37 is secured to bracket 39 with screws 41. The bracket 39 serves as a support for the motor 42 which drives the fan 43.

It will be noted that the bottom or floor of casing 38 is provided with a large opening 38a through which the major portion of the air which enters chamber 36 is expelled (to be subsequently expelled through the cover member 37 into the passenger compartment of the vehicle). This is true whether the moving air is the result of forward movement of the vehicle alone or a combination of forward movement of the vehicle plus operation of fan 43 or by operation of the fan alone. However, it will be noted that the diameter of the opening 38a is less than the diameter of the fan and the outer extremities of the fan blades overhang the perimeter of opening 38a thereby, providing in effect a baffle member or ledge 49 beneath the outer extremities of the fan blades. Thus whenever the fan 43 is operated, whether the vehicle is moving or not, the air which is displaced by the "overhanging" portions of the fan blades is directed against the baffle or ledge 49 and is pressurized to some extent as well as being rotated due to rotation of the fan. Thus the rotation of this air accompanied by the centrifugal force set up as a result of such rotation causes the air to be expelled through openings 42 in housing 38 and thence up through the ducts 46 and 47 to the windshield for defrosting purposes. The air which is displaced by the central or "non-overhanging" portions of the fan blades is expelled through opening 38a to the car interior. When the vehicle is moving forwardly the operation of the fan in expelling air through opening 38a is supplementary to the air supply which is furnished to the interior of the vehicle by forward movement of the vehicle.

The fan 43 may be manually turned on or off by means of a control knob (not shown) at the dash panel 45.

Viewing Figures 2, 4, and 6, I have shown a damper 52 which is controlled by the pushing and pulling of a Bowden wire 60 which may have a control knob on the interior of the car. A cross shaft 59 is pivotally supported at opposite ends of the cover 24 and may be flattened throughout the major portion of its length intermediate its ends so as to facilitate securing the damper 52 thereto. The cover 24 has a recessed portion 53 and the damper 52 has a cutout portion 61 which registers with the recessed portion 53 of the cover when the damper is in closed position, as shown in Figure 2. A somewhat U-shaped clip is welded to cover 24 and has downwardly depending tongues 54 and 55 providing means for limiting movement of the damper in both closed and opened positions. An arm 58 secured to the end of cross shaft 59 is actuated by wire 60 in opening and closing the damper. A bracket 56 is secured to cover 24 by bolts 57 and provides additional rigidity to support the cross shaft 59.

When the damper is in the position shown in Figure 6 air is free to pass through the heating system and when in the position shown in Figure 2 the incoming air is trapped in the chamber beneath cowl 2.

Having thus described our invention, what we claim is:

1. An air conditioning system for a vehicle having an engine compartment and a passenger compartment comprising: a partition panel separating the engine compartment from the passenger compartment of the vehicle, a cover panel having an opening to the atmosphere and being located on the engine compartment side of the partition panel, an enclosure located on the engine compartment side of the partition panel beneath the cover panel and having its interior in communication with the atmospheric opening, a portion of the partition panel serving as the rear wall of the enclosure, said enclosure having water drainage openings and an additional opening for discharge of air from the enclosure, said partition panel having an opening adjacent to but downwardly from the enclosure, a pair of retainers open at their opposite ends, one retainer being mounted on the engine compartment side of the partition panel and the other retainer being mounted on the passenger compartment side of the partition panel and both being mounted over the opening in said partition panel, a radiator core in one retainer and a fan in the other retainer, a removable cover spanning the open end of the engine compartment side retainer and also spanning the air discharge opening of the enclosure, said cover being dished in shape to provide an internal chamber establishing communication between the air discharge opening of the enclosure and the open end of the engine compartment side retainer.

2. An air conditioning system for a vehicle having an engine compartment and a passenger compartment, comprising: a partition panel separating the engine compartment from the passenger compartment of the vehicle, a cover panel having an opening to the atmosphere and being located on the engine compartment side of the partition panel, an enclosure located on the engine compartment side of the partition panel beneath the cover panel and having its interior in communication with the atmospheric opening, said enclosure having water drainage openings and an additional opening for discharging air from the enclosure, said partition panel having an opening adjacent to but downwardly from the enclosure, an open ended retainer removably secured to the partition panel on the engine compartment side thereof, a second retainer removably secured to the partition panel on the passenger compartment side thereof, both retainers being mounted over the opening in the partition panel, a radiator core in the retainer on the engine compartment side of the partition panel and a fan in the retainer on the passenger compartment side of the partition panel, a removable cover spanning the open end of the retainer on the engine compartment side of the partition panel and also spanning the air discharge opening of the enclosure, said cover being dished in shape to provide an internal chamber establishing communication between the air discharge opening of the enclosure and the open end of the retainer on the engine compartment side of the partition panel.

3. An air conditioning system as set forth in claim 2 and having a bracket secured to the open end of the retainer on the passenger compartment side of the partition panel and having a power unit for the fan secured to said bracket.

References Cited in the file of this patent
UNITED STATES PATENTS

| Number | Name | Date |
|---|---|---|
| 2,011,840 | Arnold et al. | Aug. 20, 1935 |
| 2,185,486 | Wahlberg | Jan. 2, 1940 |
| 2,213,017 | Perkins | Aug. 27, 1940 |
| 2,235,642 | Lintern et al. | Mar. 18, 1941 |
| 2,237,333 | Bretzlaff et al. | Apr. 8, 1941 |
| 2,237,477 | Colvin | Apr. 8, 1941 |
| 2,257,638 | Moore | Sept. 30, 1941 |